United States Patent

[11] 3,622,805

[72] Inventor Richard H. McMorrow, Jr.
Colorado Springs, Colo.

[21] Appl. No. 814,586
[22] Filed Apr. 9, 1969
[45] Patented Nov. 23, 1971
[73] Assignee Hewlett-Packard Company
Palo Alto, Calif.

[54] TRIGGER CIRCUIT
4 Claims, 2 Drawing Figs.

[52] U.S. Cl. .......... 307/258,
307/286, 307/322
[51] Int. Cl. .......... H03k 17/00
[50] Field of Search .......... 330/30, 30 D, 61 A; 307/235, 286, 322, 258

[56] References Cited

UNITED STATES PATENTS

| | | | |
|---|---|---|---|
| 3,211,921 | 10/1965 | Kaufman et al. | 307/286 X |
| 3,253,165 | 5/1966 | Cornish | 307/286 X |
| 3,254,238 | 5/1966 | Cooperman | 307/286 X |
| 3,289,012 | 11/1966 | Raisanen | 307/286 X |
| 3,470,497 | 9/1969 | Kotter | 307/235 X |

*Primary Examiner*—Donald D. Forrer
*Assistant Examiner*—B. P. Davis
*Attorney*—A. C. Smith

ABSTRACT: A trigger circuit uses a pair of tunnel diodes—one acting as a gate and trigger element and the other acting as a control diode for the first—to generate triggering pulses. The circuit interconnections are such that the first tunnel diode provides an output gating pulse only in response to the synchronizing signal having crossed an upper threshold level provided a reset signal has occurred and the synchronizing signal has crossed a lower threshold level. This hysteresis type response to the synchronizing signal permits selective triggering of the circuit.

INVENTOR
Richard H. McMorrow, Jr.
BY
Mortenson and Weigel
ATTORNEYS

TRIGGER CIRCUIT

BACKGROUND OF THE INVENTION

In recent years tunnel diodes and other negative resistance devices have found wide application in switching circuitry. A particular advantage in the use of tunnel diodes is their relatively high speed of operation. This capability facilitates their use in many high frequency applications. In high frequency oscilloscopes, for example, one often wishes to trigger the sweep circuit only in accordance with the zero crossover and during a positive transition of a synchronizing signal. It is also desirable that the sweep be completed before a subsequent synchronizing pulse or signal is capable of inaugurating a new sweep.

Circuitry capable of performing these functions utilizing tunnel diodes is currently available. Unfortunately, such circuitry in general is relatively complex and requires auxiliary circuit functions to provide the necessary triggering and resetting signals particularly at high frequencies. Many previous trigger schemes, for example, formed a trigger pulse on each cycle of a synchronizing signal. This trigger pulse then has to be amplified in order to trip a gate diode to initiate a gate and sweep.

It is, therefore, an object of this invention to provide an improved triggering circuit capable of operating at high frequencies.

Another object of this invention is to provide an improved triggering circuit utilizing tunnel diodes which circuit is relatively simple in construction.

BRIEF DESCRIPTION OF THE INVENTION

In a preferred embodiment of the invention a triggering circuit is triggered by a synchronizing signal attaining a predetermined level. After triggering a hysteresis effect exists—the synchronizing signal must drop to a lower level in order to reset the circuit before it can trigger again. In fact, the circuit operation is such that the synchronizing pulses cannot provide another trigger pulse until the reset pulse has occurred and the synchronizing signal has dropped to a lower level to reset the circuit. This operation permits triggering only on positive going transitions of the synchronizing signals.

The circuit includes a first and second current path connected in parallel between a point of reference potential and a first current source that will be variable to allow for variations of the circuit parameters. Each of the current paths has a serially connected current control device and an active device which exhibits a negative resistance characteristic and a triggering current level at which the active device shifts from a low to a high voltage state of operation. A synchronizing signal is differentially applied to control the current in the current control devices. A second current source supplies a second current to the junction between the active device and the current control device in the first current path. A third current source is adapted to supply a third current to a second junction between the active device and the current control device in the second current path. An impedance means is connected between the junctions. Finally a fourth current source is adapted to apply a reset signal to the second junction.

The circuit parameters are selected such that the active device in the first path cannot trigger to a high voltage state unless the active device in the second path is already in such a state. The active device in the second path is maintained in a low voltage state until the synchronizing signal drops below predetermined level.

BRIEF DESCRIPTION OF THE DRAWINGS

The novel features which are considered characteristic of this invention are set forth with particularity in the appended claims. The invention itself, however, both as to its organization and method of operation, as well as additional objects and advantages thereof, will be best understood from the following description when read in connection with the accompanying drawings in which:

DESCRIPTION OF THE PREFERRED EMBODIMENT

Figure 1:
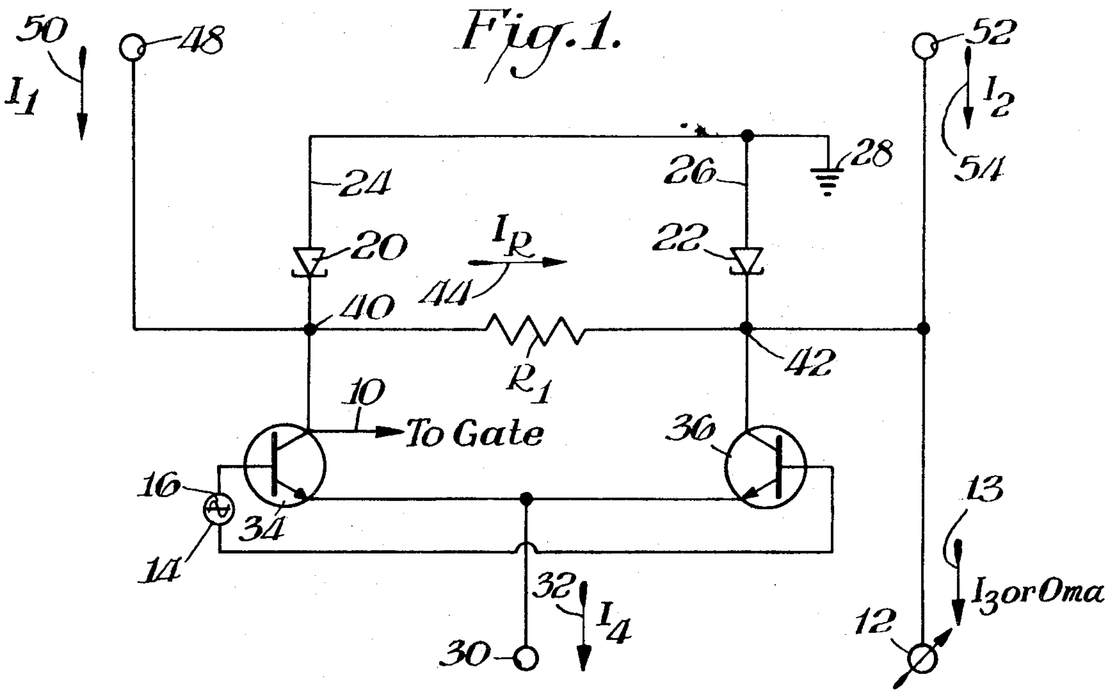
FIG. 1 is a schematic representation of a preferred form of the triggering circuit utilizing tunnel diodes constructed in accordance with this invention.

The circuit schematic illustrated in FIG. 1 is a circuit that may find use, for example, in a high frequency oscilloscope and is operated to provide a triggering or gating signal at an output terminal 10 to initiate the sweep circuit of the oscilloscope. A source of synchronizing signals 14 controls the trigger time—the circuit responds only to a predetermined shift in level of the synchronizing signal such as that derived from an adjustable current source 12. This current source normally provides a current $I_3$ flowing out of the circuit as denoted by the arrow 13, but periodically, under the control of other circuitry in the oscilloscope, drops the current level down to zero or other low value which functions as a reset control level. This reset control signal may be derived, for example, from circuitry in the oscilloscope that indicates the completion of some time function such as the sweep itself. The purpose of the reset level from the current source 12 is to control the response of the triggering circuit illustrated in FIG. 1 to a sine wave synchronizing signal 16.

The function of the circuit, as will be described, is to provide a gating signal at the output 10 upon the occurrence of a positive-going transition of the synchronizing signal 16 only after the occurrence of a reset current level from the adjustable source 12. The circuit is made responsive to the positive-going transitions by a hysteresis effect whereby, once triggered and reset, the circuit will not respond until the synchronizing signal has dropped to a lower level, i.e., crossed a lower threshold level.

The details and operation of the triggering circuit will now be described. The control circuit includes a gating tunnel diode 20 and a control tunnel diode 22 each connected in separate current paths 24 and 26, respectively. While tunnel diodes are illustrated with described, it is to be understood that the devices 20 and 22 may be any active device or circuit such as a Schmidt trigger using complementary transistors, which exhibits a negative resistance portion in its current-voltage characteristic such as that illustrated, for example, in the typical tunnel diode characteristic of FIG. 2. THe two current paths 24 and 26 are connected in parallel between a point of reference potential such as ground 28 and a current source 30 which provides the current $I_4$ denoted by the arrow 32 as flowing out of the circuit. Connected in series wi the gating diode 20 is a first current control device 34 such as an NPN transistor with a collector-emitter circuit in the current path 24. In similar manner a second current control device, also illustrated as an NPN-transistor 36, has its collector-emitter circuit connected in the second current path 26. The emitters of the transistors 34 and 36 are thus tied together to connect with the current source. THe base electrodes of the two transistors 34 and 36 are connected differentially to either side of the synchronizing source 14 such that the synchronizing signals 16 are applied in opposite polarity to the respective base electrodes.

The junction point 40 between the gating tunnel diode and its associated transistor 34 and the junction point 42 between the control diodes 22 and its associated transistor 36 have an impedance means, designated by the resistor $R_1$, connected therebetween such that the cathodes of the respective tunnel diodes are connected together through the resistor $R_1$. The current flowing through the resistor is denoted by the arrow 44 arbitrarily denoting current flow and is designated by the symbol $I_R$.

A source of constant current 48 provides a constant current $I_1$ denoted by the arrow 50, feeding into the junction 40. In like manner, a current source 52 provides a constant current $I_2$ denoted by the arrow 54, feeding into the junction 42 in the second current path 26. The reset current source 12 extracts current from the same junction point 42 in the second current path.

All of the current source illustrated may be well-known current sources. All of such current sources have the common characteristic that they exhibit a relatively high output impedance such that their currents are relatively unaffected by the operation of the circuitry with which they are associated. For simplicity of explanation and by way of example only, it will be assumed the current provided by the second and fourth current sources $I_2$ and $I_4$, respectively, are equal and that the current $I_3$ provided by the reset current source 12 is made larger than twice that of the second current $I_2$. Furthermore, the value of the currents $I_2$ or $I_4$ provided by the second or fourth current source is selected such that two times the value of $I_2$ or $I_4$ is close to the triggering current $I_p$ (FIG. 2) required to trigger the tunnel diodes. The value for the resistor $R_1$ will be discussed in the description of the circuit operation below.

Figure 2:
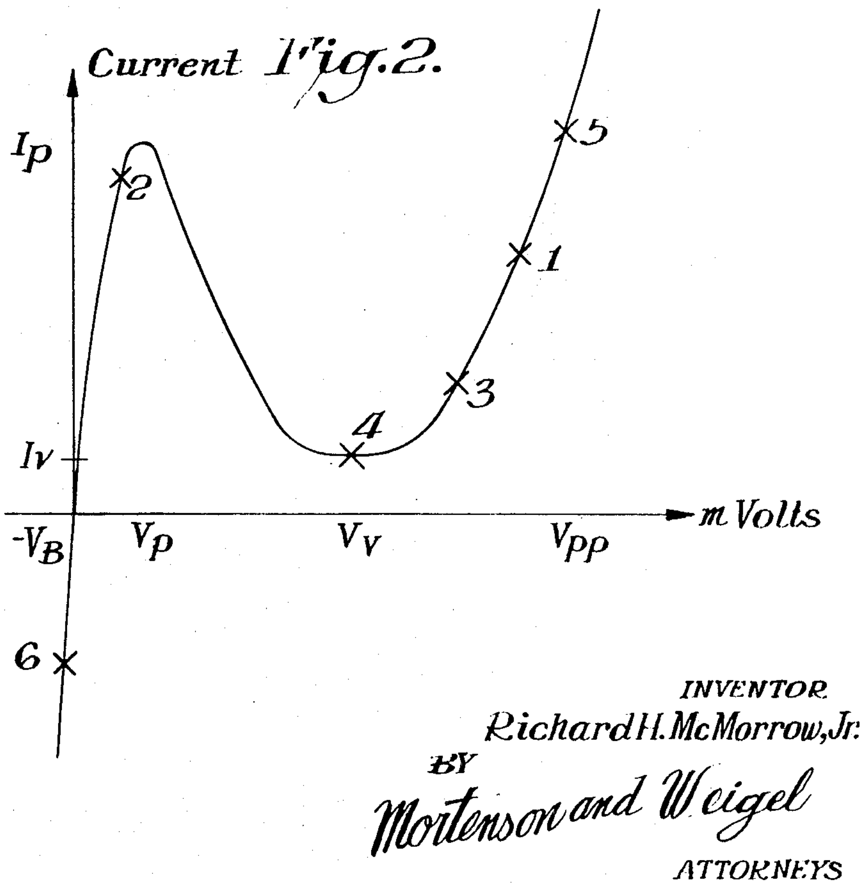
FIG. 2 is a graph illustrating the relationship between the current and the voltage across a typical tunnel diode such as is employed in the circuitry of FIG. 1.

In the operation of the circuit, the gating diode is in a condition to be triggered when the control diode 22 is "on," i.e., in its high voltage state of operation typically corresponding to the operating point designated "1" on the current-voltage characteristic of FIG. 2. The gating diode 20 is "off," , i.e., in its low voltage state when biased to the operating point designated by the numeral "2" in FIG. 2 by the current $I_R$ (caused by the voltage difference $V_{pp}-V_p$ between the cathodes of the two diodes 20 and 22, respectively, the current through the first transistor 34 designated $I_{34}$ which is below the triggering point of the gating diode 20 and $I_1$ from the source 48.

To provide the hysteresis effect in accordance with this invention, the circuit is designed to trigger only upon the synchronizing signal reaching a predetermined threshold level and there only if the synchronizing signal has earlier dropped to a lower threshold level. The difference between these levels is the "hysteresis" of the circuit. These hysteresis levels are established by the current available to the gating diode 20 from the first transistor when the control diode is "on" for the upper threshold level. The lower threshold level is established by the minimum current flowing through the first transistor 34 that does not allow the control diode 22 to trigger to its "on" state. Thus the control diode 22 is held in its low voltage state of operation until the current in the first transistor 34 is less than that required to trigger the gating diode 20.

In the assumed example, this lower threshold condition exists when the constant currents $I_3$ and $I_4$ are selected to limit the triggering current available to the control diode to a value that is insufficient to trigger the diode. Only if the current to the first transistor 34 is less than that required to trigger the gating diode is the control diode permitted to be reset to its high voltage state. To achieve this hysteresis type operation, and thereby control the triggering threshold level of the gating diode 20, the impedance $R_1$ must be selected to meet three different criteria. These criteria will now be described. Firstly, the resistor R must be selected to be large enough so that the desired value of current through the first transistor 34 is capable in the first instance of triggering the gating diode 20 into the high voltage state denoted by the point "1" in the FIG. 2 characteristic. As the synchronizing signal 16 increases in amplitude in a positive-going sense, the current through the first transistor 34 increases in magnitude until the current flowing through the gating diode 20 is greater than the triggering value (point 2) (FIG. 2) and the gating diode is forced into its high voltage state of operation which in turn provides a negative-going output signal on output 10 to control some timing function as previously described.

In order that the timing function is not interrupted by further inputs from the synchronizing signal, both of the tunnel diodes 20 and 22 are biased to remain in their high voltage state of operation by proper selection of the resistor R. If the current through the first transistor 34 is greater than the sum of the first current $I_1$ and the current of $I_V$, corresponding to the valley point 4 in the characteristic of FIG. 2, it may be seen from a study of the characteristic that both of the diodes 20 and 22 will remain on or about an operating point designated by the point 3 in FIG. 2.

The worst case condition for this mode of operation, i.e., immediately after the occurrence of the synchronizing signal, exists when the synchronizing signal 16 is either removed or returns to zero. At this point, the value of the resistor R must be small enough to supply the current $I_1+I_V$ through the resistor $R_1$. At this condition, when this synchronizing pulse 16 is zero, the gating diode 20 is biased to an operating point 4 and has a current flow $I_V$ while the control diode 22 carries (since $I_4=I_2$) a current $I_3-I_V-I_1$. This operating point is approximately that denoted by the numeral 5 on the characteristic of FIG. 2 such that the voltage drop across the resistor R is seen to approximately $V_{pp}-V_v$.

The next criteria imposed upon the value of the resistor R is that imposed at the completion of the time function when the reset current level provided by the adjustable source 12 drops essentially to zero. The purpose of dropping this current source to zero is to reset both of the diodes 20 and 22 to their low voltage states and thereby terminate the gating signal generated by the gating diode 20. If the current through the second transistor 36 is large and that through the first transistor 34 small, both diodes 20 and 22 will switch to their low voltage state (operating point 2 in FIG. 2) as there is no current available to the control diode 22 and only the back biasing current $I_1$ available to the gating diode 20. However, from a design standpoint, the worst case condition must be selected in order to insure that both diodes will turn off at such worse case condition. This worst case condition occurs when the first transistor 34 is "on" and the second transistor is "off." Under these conditions, this control diode 22 is back biased by the constant current $I_2-I_R$ and the diode falls to the operating point 6 at which its voltage drop is $-V_B$ (FIG. 2). Since the current to the second transistor 36 with the first transistor off equals $I_4$, the resistor R must be small enough so that the current $I_4$ is less than $I_1+I_V+(V_V+V_B1R)$. If this condition is achieved, the gating diode 20 cannot sustain the required valley current $I_V$ and falls to its low voltage state of operation.

Thus by way of summary, the three criteria that must be used in the selection include: (1) R must be large enough for the first transistor 34 to fire the gating diode 20 to its high voltage state when the second diode is at its high voltage state, (2) R must be sufficiently small in value to supply current $I_1+I_V$ through the resistor R with a voltage drop of $V_{pp}-V_V$, (3) the value of the resistor R must be sufficiently small such that when the reset signal occurs $I_3=0$) $I_4$ is less than $I_1+I_V+(V_V+V_B/R)$ such that the "on" current through the gating diode 20 cannot be sustained.

At the end of the reset period, the current from the source 12 is again returned to the value $I_3$. It is assumed that by now both diodes have been reset to their low voltage state. The several current sources must be selected to provide a current such that the control diode 22 will not return to its high voltage state, and thus permit the gating diode 20 to provide an output gating signal, until the synchronizing signal is below the lower threshold level. The minimum current through the first transistor that does not permit the control diode 22 to switch "on" is readily determined.

If at the termination of the reset current level there is a high current flowing through the first transistor 34 i.e., if $I_{34}$ is large enough to trigger the gating diode 20 when the control diode 22 is "on," then by proper selection of the currents $I_3$ and $I_4$ there will be insufficient current to exceed the trigger current level of the control diode 22. Thus, the current $I_{36}$ in the second transistor is insufficient to allow the control diode 22 to switch into its high voltage state. This condition exists if the triggering current level for the second diode $I_{p2}$ is more than $I_3+I_{36}$(trigger)$-I_2I_1$ where $I_{36}$(trigger) is the value of the current in the second transistor $I_{36}$ when the gating diode 20 has enough current to trigger. However, since the voltage across the diodes is nearly equal, it is seen that $I_R$ is approximately equal to zero and, since by assumption $I_2$ was made equal to $I_4$, then $I_2$ is more than $I_3$—$I_{34}$(trigger). By satisfying this inequality, the desired hysteresis type operation whereby the second or control diode 22 is maintained in its low voltage state to thereby prevent the triggering of the gating diode 20 except on the positive transition of the synchronizing waveform 16.

It is to be understood that whereas this circuit operation has been illustrated and described in connection with a tunnel diode, this same triggering arrangement can be accomplished using other devices and circuits having similar current-voltage characteristics. in still other embodiments, as can be seen from the form of the hysteresis relations, the circuit can be used to have near zero hysteresis (ideal triggering) or even astable triggering to lock onto high frequency signals, if it is desired to control $I_1$ or other current. This would control the "sensitivity"of the triggering current. Further the currents $I_2$ and $I_4$ may be varied and made equal or unequal. The same is true of the diodes.

The invention described is a circuit in which the gating diode is triggered by the synchronizing signal achieving a threshold level. Thereafter the circuit cannot trigger again until a reset signal is applied and after reset, the synchronizing signal has achieved some lower threshold level. The difference between ;these threshold levels is the hysteresis of the circuit which facilitates triggering in response to a predetermined portion of the synchronizing signal. The circuit described is simple to construct, accurate and capable of high frequency operation.

It is obvious that many embodiments may be made of this inventive concept and that many modifications may be made in the embodiments hereinbefore described. Therefore, it is to be understood that all descriptive matter herein is to be interpreted merely as illustrative, exemplary, and not in a limited sense. It is intended that various modifications which might readily suggest themselves to those skilled in the art be covered by the following claims, as far as the prior art permits.

What is claimed is:

1. A triggering circuit for providing an output gate signal in response to appearance of a reset signal and a predetermined portion of a synchronizing signal, comprising:

a point of reference potential;

a first current source for providing first current;

a pair of current control devices, each capable of controlling current therethrough in response to applied signal;

first and second active devices, each exhibiting a negative resistance characteristic and having a triggering current level at which said device shifts from a low to a high voltage state of operation;

first and second current paths connected in parallel between said point of reference potential and said first current source, each of said paths having a serially connected current control device and an active device;

means to apply said synchronizing signal differentially to said current control devices to control the current therethrough;

means adapted to supply currents to the junctions between said active device and said current device in each of said current paths;

means coupled to one of said junctions for producing an output gate signal at the other of said junctions in response only to the sequential occurrence of a reset signal applied to said one of the junctions and a predetermined portion of a synchronizing signal applied to the current control devices; and impedance means connected between said junctions for limiting the current flow therebetween to permit the first active device to trigger when the second active device is in said high voltage state and said synchronizing signal achieves a predetermined threshold level.

2. A circuit according to claim 1 wherein:

said first and second active devices are tunnel diodes; and the level of current flow through said impedance means combined with the current level in the first active device for an applied synchronizing signal in excess of predetermined level establishes a current level in the second active device which is insufficient to trigger the second active device to the high voltage operating state.

3. A circuit according to claim 2 wherein the value of said impedance means establishes a supply of current sufficient to maintain both said devices in said high voltage state in the absence of said synchronizing signal for sustaining said output gate signal at the other of said junctions.

4. A circuit according to claim 3 wherein the value of said impedance means establishes current level which is insufficient to sustain said first active device in said high voltage state in the presence of said reset signal.

* * * * *

UNITED STATES PATENT OFFICE
CERTIFICATE OF CORRECTION

Patent No. 3,622,805 Dated November 23, 1971

Inventor(s) Richard H. McMorrow, Jr.

It is certified that error appears in the above-identified patent and that said Letters Patent are hereby corrected as shown below:

Column 2, line 42, "illustrated with" should read -- illustrated and --; line 47, "THe" should read -- The --; line 51, "wi the" should read -- with the --; line 58, "THe" should read -- The --;

Column 4, line 39, "$I_1+I_V+(V_V+V_B 1R)$" should read -- $I_1+I_V+(V_V+V_B/R)$ --;

Column 5, line 12, "in still" should read -- In still --;

Column 6, line 32, after "of" insert -- a --; line 42, after "establishes" insert -- a --.

Signed and sealed this 16th day of May 1972.

(SEAL)
Attest:

EDWARD M.FLETCHER,JR.
Attesting Officer

ROBERT GOTTSCHALK
Commissioner of Patents